United States Patent [19]

Maeda

[11] Patent Number: 4,984,766
[45] Date of Patent: Jan. 15, 1991

[54] FLOW-CONTROL VALVE

[75] Inventor: Naohiro Maeda, Katsuta, Japan

[73] Assignee: Hitachi, Ltd., Tokyo, Japan

[21] Appl. No.: 418,217

[22] Filed: Oct. 6, 1989

[30] Foreign Application Priority Data

Oct. 18, 1988 [JP] Japan ................... 63-260470

[51] Int. Cl.⁵ ............................................ F16K 31/06
[52] U.S. Cl. ......................... 251/129.11; 251/129.12
[58] Field of Search ................. 251/129.11, 129.12, 251/298

[56] References Cited

U.S. PATENT DOCUMENTS

| | | | |
|---|---|---|---|
| 3,047,019 | 7/1962 | Simpson | 251/298 X |
| 4,428,356 | 1/1984 | Kemmner | 251/129.11 X |
| 4,577,832 | 3/1986 | Sogabe | 251/129.11 X |
| 4,580,761 | 4/1986 | Silcox et al. | 251/129.11 |
| 4,640,492 | 2/1987 | Carlson, Jr. | 251/298 X |

FOREIGN PATENT DOCUMENTS 62-75046  4/1987  Japan .

Primary Examiner—Arnold Rosenthal
Attorney, Agent, or Firm—Antonelli, Terry, Stout & Kraus

[57] ABSTRACT

A flow-control valve comprising a rotary valve member is moved eccentrically and which has a valve-sheet surface formed as a partial cylindrical surface and which is adapted to perform airflow control through its rotation, and two opening which are on the side of an air passage to be controlled by the rotary valve member. A length of the valve-sheet surface of the rotary valve member in the direction in which it rotates is larger than a length of the opening in the same direction, the valve member rotating with the valve member faced the openings over an entire range of rotation of the valve member.

5 Claims, 2 Drawing Sheets

FLOW-CONTROL VALVE

BACKGROUND OF THE INVENTION

This invention relates to a valve device for controlling the intake airflow of an internal combustion engine, and in particular, to an electromagnetic flow-control valve suitable for controlling the airflow by-passing the throttle valve of an automobile gasoline engine in order to control the idle speed of the engine.

In an automobile engine, the idle speed thereof greatly influences the exhaust-gas condition and the fuel consumption. Whether the idle speed is sufficiently stabilized at a predetermined value is an important factor in an automatic-transmission-type automobile from the viewpoint of preventing "creep" (an advance of a vehicle under the idle condition). In view of this, a so-called ISC (idle-speed controller) has come into common use. The ISC measures the engine speed and effects electrical feedback control of the intake airflow by-passing the throttle valve in such a manner that the measured engine speed converges on a predetermined target figure.

The ISC needs a valve device which controls the above-mentioned intake airflow by-passing the throttle valve by means of an actuator (an electromechanical converter for valve drive). The rotary-valve devices disclosed in Japanese Patent Laid-Open No. 62-75046 and U S. Pat. No. 4428356 are examples of such valve devices. In these prior art devices, air leakage when the valve is in the completely closed position is restrained to a minimum degree, thus providing a satisfactory controllability.

The above prior art devices have such a problem that a sticking of the rotary-valve member and a need for setting valve-opening characteristics with respect to the rotation angle of the rotary-valve member are not taken into consideration. Furthermore, no particular consideration is given to a possibility of connecting the valve member for controlling the intake airflow with the actuator for driving it. As a result, these prior art devices need to require a relatively complicated construction.

SUMMARY OF THE INVENTION

It is accordingly an object of this invention to provide a flow-control valve which involves no problems regarding the mutual sticking of the rotary-valve members or the setting of the valve-opening characteristics, which has a simple overall construction including the actuator, which can be produced at lower cost with ease, and which is ideal as an electromagnetic-type valve device.

In order to achieve the above object, this invention provides a flow-control valve comprising a rotary valve member which has a valve-sheet surface formed as a portion of an eccentric cylindrical surface and which is adapted to perform airflow control through its rotation, an opening communicating with an air passage to be controlled in opening degree by the rotary valve member, and the length of a valve-sheet surface of the rotary member, in the direction in which it rotates is larger than the length of the opening in the same direction, so that airflow control can be performed with the rotary valve member constantly facing the opening on the side of the air passage over the entire range of its rotation. The above-mentioned rotary valve member preferably constitutes a part of a magnetic circuit which forms an electromagnetic actuator. Thus, the driving force for opening and closing the valve member for flow control is generated by the valve member itself.

DETAILED DESCRIPTION OF THE PREFERRED EMBODIMENTS

An embodiment of an electromagnetic flow-control valve in accordance with this invention will now be described in detail with reference to the accompanying drawings.

Figure 1:
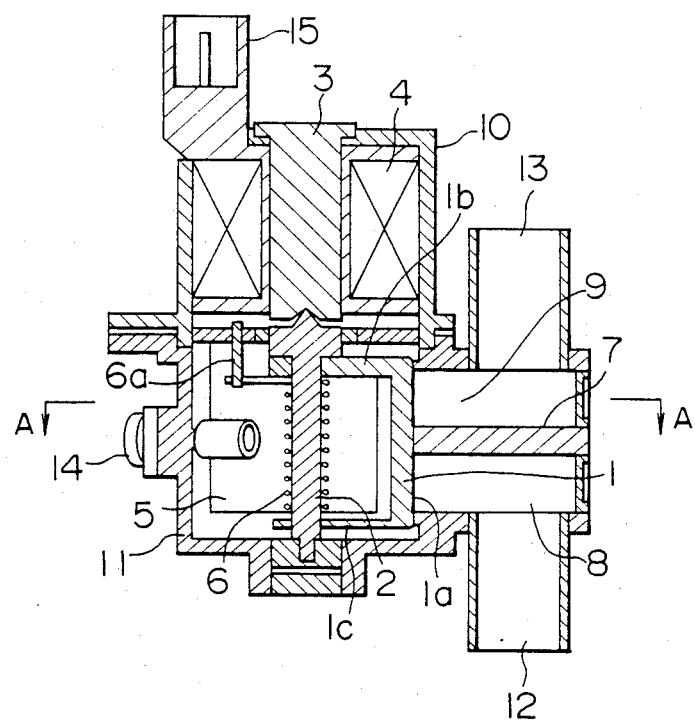
FIG. 1 is a schematic longitudinal sectional view of an embodiment of this invention.
Figure 2:
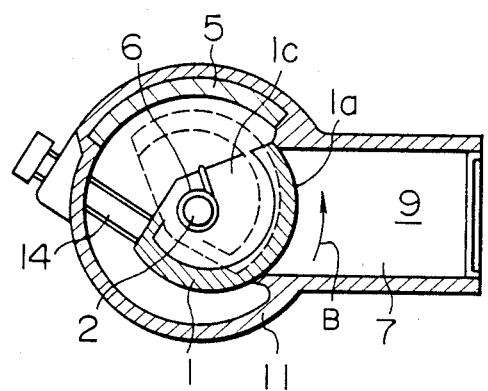
FIG. 2 is a schematic cross-sectional view taken along the line A—A of FIG. 1.

FIGS. 1 and 2 are a front sectional view and a cross-sectional view, respectively, of an embodiment of this invention.

The reference numeral 1 indicates a valve member comprising a valve-sheet surface 1a having a substantially cylindrical configuration, as well as an upper and a lower fan-shaped support section 1b and 1c. This valve member 1 is firmly attached to an axle 2. The upper and lower ends of this axle 2 are rotatably supported by a center yoke 3 and a housing 11, respectively. Accordingly, the valve member 1 can be rotated in the direction indicated by the arrow B as well as in the direction reverse to that. Referring to FIG. 2, the central axis C of the cylindrical valve-sheet surface 1a is eccentric to the axis of rotation of axle 2. In the embodiment shown in FIG. 2, the central axis C is situated above the axis of rotation of axle 2 in the drawing. The length in the rotational direction of this valve-sheet surface 1a is larger than the length in the rotational direction of an opening of air-passages 8, 9 which are to be flow-controlled by the valve-sheet surface 1a, so that, over the entire rotational range of the valve member 1, its valve-sheet surface 1a constantly faces the opening of the air-passages 8, 9.

The valve member 1 and the axle 2 are made of a predetermined magnetic material, such as soft steel, so that a function of an electromagnetic actuator will be obtained as stated below.

An electromagnetic coil 4 is provided around the center yoke 3 and is connected to an exterior controller through a terminal 15, generating a predetermined magnetic field around the center yoke 3.

A pole piece 5 is attached to an inner surface of the housing 11 or integrally formed with a coil cap 10 which is made of a magnetic material, such as soft steel. The pole piece 5 is in contact with a lower-end section of this coil cap 10 so that it will form a part of a magnetic circuit with respect to the magnetic field formed by the electromagnetic coil 4, and faces the valve-sheet surface 1a of the valve member 1 when the valve member is at a predetermined position of rotation (indicated by the broken line).

A return spring 6 is provided between the axle 2 and a lock member 6a fixed to the housing 11, in such a manner that a rotational force is exerted in a direction reverse to that indicated by the arrow B. Thus, when no electricity is being supplied to the electromagnetic coil 4, the return spring 6 causes the valve member 1 to stay in the rest position in which it partly abuts against an adjusting screw 14, as shown in FIG. 2. In this rest position, the valve member 1 completely closes the air passage 9. The adjusting screw 14 allows the rest position of the valve member 1 to be arbitrarily adjusted.

The air passages 8, 9 have a substantially rectangular section and are separated from each other by a partition 7. These air passages 8, 9, thus separated, have respective opening chambers at their ends on the side of the valve member 1. When the valve member 1 is in the position shown in FIG. 2, these opening chambers are uniformly in close contact with the valve-sheet surface 1a of the valve member 1. The other ends of the air passages 8, 9 are closed by some appropriate member.

Air ducts 12 and 13 communicate with the air passages 8 and 9, respectively. One of these air ducts, for example, the air duct 12, communicates with an upstream side of the throttle valve of engine intake pipe; the other, i.e., the air duct 13, communicates with a downstream side of the throttle valve.

Next, the operation of this embodiment will be described.

As stated above, the valve member 1 is biased by the rotating force of the return spring 6, which exerts a force in a direction reverse to the arrow B of FIG. 2. Accordingly, when no electricity is being supplied to the electromagnetic coil 4, the valve member 1 is biased to a position determined by the adjusting screw 14. As a result, the opening chambers of the air passages 8, 9 are closed by the valve-sheet surface 1a of the valve member 1. A communication between the air passages 8 and 9, i.e., between the air ducts 12 and 13, is then completely interrupted, or the airflow therebetween is reduced to a minimum.

When an electric current of a predetermined magnitude is supplied to the electromagnetic coil 4 through the terminal 15 of the coil, a magnetic field is generated around the coil, generating a magnetic flux which runs through a closed magnetic circuit formed by the center yoke 3, the coil cap 10, the pole piece 5, and the valve member 1 which are all magnetic members. As a result, an attracting force is generated between the pole piece 5 and the valve body 1. Thus, the function of an electromagnetic actuator is obtained.

By virtue of the configuration of the pole piece 5 and of the valve member 1 as well as the positional relationship therebetween at this time (as indicated in FIG. 2), this attracting force is realized in the form of a rotational force which is exerted in the direction indicated by the arrow B in FIG. 2. As a result, the valve member 1 is urged to rotate in the direction of the arrow B against the restoring force of the return spring 6. When the magnitude of the electric current being supplied to the electromagnetic coil 4 exceeds a predetermined value, the valve member 1 starts to rotate, moving to a position where the attracting force is in equilibrium with the restoring force of the return spring, for example, the position indicated by the broken line of FIG. 2.

As stated above, the valve-sheet surface 1a of the valve member 1 is eccentric to the axis of rotation axle 2, so that, when the valve member 1 rotates from the rest position in the direction of the arrow B, the valve-sheet surface 1a is spaced from the opening chambers of the air passages 8, 9. The close contact between the valve-sheet surface 1a and the aperture sections of the air passages 8, 9 is then dissolved, and a clearance substantially in proportion to the rotating angle appears at the aperture sections of the air passages 8, 9.

When the valve-sheet surface 1a is thus apart from the aperture sections of the air passages 8, 9, the clearance provided thereby causes the lower air passage 8 to communicate with the upper air passage 9, thus providing an air passage between the air ducts 12 and 13, which means the valve is opened. The valve opening at this time is appropriately proportional to the size of the clearance mentioned above, and is determined by the restoring force of the return spring 6 and the magnetomotive force obtained by the electromagnetic coil 4, i.e., the magnitude of the electric current supplied to this electromagnetic coil 4. In other words, the valve opening can be arbitrarily controlled by controlling this electric current.

Thus, in accordance with this invention, the valve-drive actuator is functionally integrated with the valve device, the valve member 1 being directly driven by the attracting force exerted between the pole piece 5 and the valve member 1. As a result, the moving components can be practically restricted to the valve member 1, thereby attaining simplification in structure and cost reduction to a sufficient degree.

Furthermore, since this embodiment employs an airflow control system of the type using a rotary valve member having a valve-sheet surface formed as an eccentric cylindrical surface, the valve-sheet surface is only in contact with the associated opening chambers when the valve is in the completely closed position. As shown in FIG. 2, the opening of the valve is effected by moving the rotary valve member in the direction in which its valve-sheet surface is spaced from the associated opening chambers, so that no sliding movement takes place between them. Accordingly, the malfunction which is due to the sticking of the valve member caused by the adhesion to the chambers of sticky substances that are likely to be contained in the engine intake air can be restrained to a sufficient degree, thereby making it possible to maintain a high degree of reliability with ease.

In addition, the completely closed position of the valve member 1 in this embodiment is determined by the adjusting screw 14, which means the final rest position of this valve member is given not by the opening chambers but by the adjusting screw 14, against which it abuts when it is returned to the completely closed position by the return spring 6. Accordingly, there is no danger whatever of the valve-sheet surface 1a of the valve body 1 partly fitting into the opening chambers of the air passages 8, 9 when it returns to the completely closed position. This arrangement is advantageous in that it helps to preclude any obstruction to the valve operation, thus making it possible to maintain sufficient reliability also in this respect.

Figure 3:
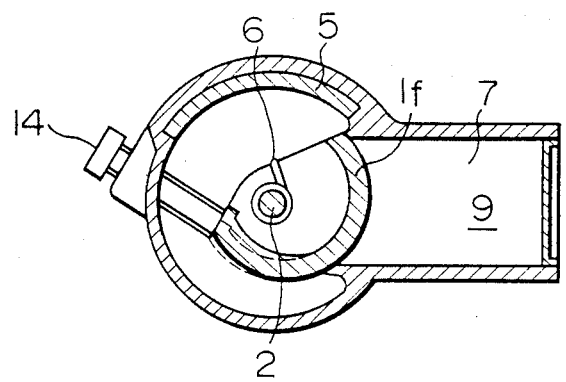
FIG. 3 is a schematic cross-sectional view of another embodiment of this invention.
Figure 4:
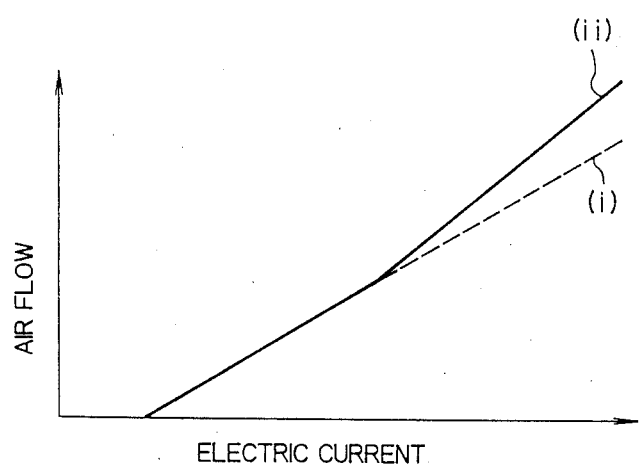
FIG. 4 is a flow-characteristic chart of the device of this invention.

Next, another embodiment of this invention will be described with reference to FIG. 3. The valve-sheet surface 1f of this embodiment is formed as a composite cylindrical surface composed of at least two different cylindrical surfaces having different radiuses, i.e., as a so-called compromise eccentric cylindrical surface. As a result of this arrangement, the size of the clearance between the valve member 1 and the opening chambers changes in a non-linear manner with respect to the rotating angle of the valve body. That is, the rate of change of the clearance size with respect to the rotating angle is changed when the valve member 1 is rotated beyond a certain rotating angle, so that a non-linear valve-opening characteristic can be obtained. The broken line in FIG. 4 represents the valve-opening characteristic of the embodiment shown in FIGS. 1 and 2, and the solid line that of the embodiment shown in FIG. 3. Referring to FIG. 4, each of the characteristics of the valve members in the first and second embodiments are indicated by a straight line (i) and a folded line (ii), respectively.

As shown in FIG. 4, this second embodiment allows the intake airflow to be controlled in a non-linear manner with respect to the magnitude of the electric current supplied to the electromagnetic coil 4.

The valve-opening characteristic of this embodiment can be arbitrarily determined in accordance with the configuration of the valve-sheet surface 1f of the valve member 1.

In the above-described embodiments, the size of that section of the housing 11 where the valve member 1 is lodged is such that there exists a sufficient clearance between the valve body 1 and the housing 11. Accordingly, the sticking of the valve body 1 due to the adhesion of stickly substances or the like to this section can be reliably eliminated.

What is claimed is:

1. A flow-control valve comprising a rotary valve member which is mounted eccentrically and has a valve-sheet surface formed as a partial cylindrical surface and which is adapted to perform airflow control through its rotation, and an opening which is mounted on one side of an air passage and of which a degree is controlled by said rotary valve member, a length of said valve-sheet surface of said rotary valve member in the direction in which said rotary valve rotates being larger than a length of said opening the same direction, and said valve member rotating with said valve member faced said opening over an entire range of rotation of said valve member, wherein said air passage to be controlled by said rotary valve member has two openings respectively associated with forward and backward passages arranged adjacent to each other, said two openings being controlled to be opened and closed by said rotary valve member at the same opening rate.

2. A flow-control valve according to claim 1 wherein said cylindrical surface constituting said valve-sheet surface is composed of at least two cylindrical surfaces having different radiuses.

3. A flow-control valve comprising a rotary valve member which has a valve-sheet surface formed as a partial cylindrical surfaces and which is adapted to perform airflow control through its rotation; a magnetic circuit which has said rotary valve member as a part of its magnetic path and of which magnetic resistance changes as said rotary valve member rotates, a rotational position of said rotary valve member being controlled by controlling the magnetomotive force of said magnetic circuit; and a spring mechanism to rotationally bias said rotary valve member in a direction in which said openings are completely closed, said magnetic circuit urging said rotary valve member to rotate in an opening direction of said openings.

4. A flow-control valve according to claim 3, wherein the electromotive force of said magnetic circuit is provided by an electromagnetic coil.

5. A flow-control valve as claimed in claim 3, further comprising an adjustable lock mechanism which determines a completely closed position of said rotary valve member.

* * * * *